United States Patent [19]
Becker

[11] Patent Number: 6,092,738
[45] Date of Patent: Jul. 25, 2000

[54] FUEL NOZZLE CONFIGURATION FOR A FLUID-FUEL BURNER, OIL BURNER USING THE FUEL NOZZLE CONFIGURATION AND METHOD FOR REGULATING THE FUEL SUPPLY OF A FLUID-FUEL BURNER

[75] Inventor: Bernard Becker, Mülheim an der Ruhr, Germany

[73] Assignee: Siemens Aktiengesellschaft, Munich, Germany

[21] Appl. No.: 09/050,650

[22] Filed: Mar. 30, 1998

Related U.S. Application Data

[63] Continuation of application No. PCT/DE96/01860, Sep. 27, 1996.

[30] Foreign Application Priority Data

Sep. 29, 1995 [DE] Germany ............... 195 36 534

[51] Int. Cl.⁷ .................................................. B05D 9/00
[52] U.S. Cl. .................................. 239/127; 239/125
[58] Field of Search .................... 239/127, 124, 239/125

[56] References Cited

U.S. PATENT DOCUMENTS

| | | | |
|---|---|---|---|
| 2,373,707 | 4/1945 | Peabody | 239/125 |
| 2,687,330 | 8/1954 | Pearce | 239/125 |
| 2,721,765 | 10/1955 | Greenland. | |
| 2,743,137 | 4/1956 | Wilson | 239/125 |
| 4,790,480 | 12/1988 | Rennie | 239/125 |
| 5,775,588 | 7/1998 | Hallstrom et al. | 239/127 |

FOREIGN PATENT DOCUMENTS

| | | |
|---|---|---|
| 1025118 | 4/1953 | France. |
| 2 452 667 | 10/1980 | France. |
| 22 076 | 10/1961 | Germany. |
| 1138 987 | 10/1962 | Germany. |
| 1 179 421 | 10/1964 | Germany. |
| 32 35 080 A1 | 3/1984 | Germany. |
| 649970 | 2/1951 | United Kingdom. |
| 819042 | 8/1959 | United Kingdom. |
| 918411 | 2/1963 | United Kingdom. |

*Primary Examiner*—Carroll B. Dority
*Attorney, Agent, or Firm*—Herbert L. Lerner; Laurence A. Greenberg

[57] ABSTRACT

A fuel nozzle configuration for a fluid-fuel burner includes a main axis, a backflow region, a fuel nozzle and an inflow region disposed along the main axis between the fuel nozzle and the backflow region. A swirl flow of fuel can be generated in the inflow region. The backflow region has an annular gap adjacent the inflow region which narrows in the direction downstream of the inflow region and merges into a backflow conduit. An oil burner for a gas turbine uses the fuel nozzle configuration and a method is provided for regulating the fuel supply of a fluid-fuel burner.

16 Claims, 2 Drawing Sheets

FUEL NOZZLE CONFIGURATION FOR A FLUID-FUEL BURNER, OIL BURNER USING THE FUEL NOZZLE CONFIGURATION AND METHOD FOR REGULATING THE FUEL SUPPLY OF A FLUID-FUEL BURNER

CROSS-REFERENCE TO RELATED APPLICATION

This application is a continuation of International Application PCT/DE96/01860, filed Sep. 27, 1996, which designated the United States.

BACKGROUND OF THE INVENTION

Field of the Invention:

The invention relates to a fuel nozzle configuration for a fluid-fuel burner having a main axis, a backflow region, a fuel nozzle and an inflow region for generating a swirl flow of fuel in the inflow region. The invention furthermore relates to an oil burner using such a fuel nozzle configuration and to a method for regulating the fuel supply of a fluid-fuel burner.

In fluid-fuel burners, particularly in a gas turbine, the fluid fuel is injected into a combustion chamber through a fuel nozzle configuration. It is necessary for the fuel quantity being supplied to be controlled as a function of the thermal output to be generated and of the hot-gas quantity occurring as a result of the combustion of the fluid fuel. If the fuel quantity is fed constantly into the fuel nozzle configuration, that regulation of the fuel quantity can be achieved by bringing about a backflow of fuel out of the fuel nozzle configuration without the fuel being introduced into the combustion chamber.

East German Patent 22 076 describes an atomizer having a return regulation for liquid fuels, for example for gas turbine plants, in which an improvement in an operation of closing an outlet orifice in the atomizer is to be achieved. Fuel is supplied to a swirl chamber through tangential supply ducts in the atomizer. Perforations are provided in the bottom of the swirl chamber through which the fuel quantity to be returned is returned through one or more return ducts and a return conduit into a fuel tank, but the perforations are not specified in any more detail. German Published, Non-Prosecuted Patent Application DE 32 35 080 A1 likewise deals with the structure of an outlet orifice of an injection nozzle. A return injection nozzle described therein for a gas-turbine burner has a cylindrical return needle in the flow return.

SUMMARY OF THE INVENTION

It is accordingly an object of the invention to provide a fuel nozzle configuration for a fluid-fuel burner, an oil burner using the fuel nozzle configuration and a method for regulating the fuel supply of a fluid-fuel burner, which overcome the hereinafore-mentioned disadvantages of the heretofore known devices and methods of this general type and in which the fuel nozzle configuration has a backflow region for a backflow of fuel, that can be produced simply and remains fixed in a geometrically exact manner for a lengthy period of time even under mechanical and thermal loads.

With the foregoing and other objects in view there is provided, in accordance with the invention a fuel nozzle configuration for a fluid-fuel burner, comprising a main axis; a backflow region along the main axis; a fuel nozzle along the main axis; an inflow region disposed along the main axis between the fuel nozzle and the backflow region, for generating a swirl flow of fuel in the inflow region; and a backflow conduit; the backflow region having an annular gap adjacent the inflow region, the annular gap narrowing in a direction away from the inflow region and merging into the backflow conduit.

In accordance with another feature of the invention, the backflow region having the annular gap which merges narrowingly into a backflow conduit can be produced mechanically in a simple way, for example by lathe turning and/or drilling, can be aligned in a geometrically exact manner in the fuel nozzle configuration and, due to the simple geometry and production possibility, is fixed in its geometrical configuration even under high thermomechanical loads. The annular gap forms a core which is preferably directed along the main axis and has the shape of a needle. This core is likewise fixed geometrically and can serve for stabilizing a swirl flow of fuel which leads out of the fuel nozzle. This swirl flow is achieved, for example, through the use of a tangential inflow of fuel to the inflow region, with the inflow taking place in a direction tangential to a circle extending perpendicularly relative to the main axis. The fuel flow being supplied divides in the inflow region, with part of the flow being capable of being returned to a fuel tank through the annual gap and the backflow conduit. In this case, the swirl of the fuel flow is broken down in the annular gap, so that a fuel flow which is essentially swirl-free or at least has reduced swirl occurs in the backflow conduit. The flow resistance in the backflow conduit thus has a low value. During the flow through the annular gap in the direction of the main axis, the swirl prevailing in the flow is broken down to a corresponding extent, depending on the selected narrowing, while a reaction on the rotational symmetry of the fuel flow in the fuel nozzle is avoided. Moreover, the simple geometrical structure ensures dimensional stability of the core formed by the annular gap. The flow losses in the backflow region are also low. The swirl breakdown in the backflow region commences well upstream, that is to say in the vicinity of the inflow region and, depending on the degree of narrowing, takes place in a more or less long axial region. Furthermore, the commencement of the swirl breakdown takes place with a weak effect, with the result that the rotational symmetry of the swirled fuel flow in the fuel nozzle is not disturbed.

In accordance with a further feature of the invention, the backflow region is composed of at most two parts, in particular of a single part.

In accordance with an added feature of the invention, the annular gap is constructed to be largely circular and symmetrical relative to the main axis, thereby reliably avoiding any influence on the rotational symmetry of the swirl flow in the fuel nozzle.

In accordance with an additional feature of the invention, in order to reduce the swirl of the fuel flow in the backflow region, the annular gap has a cross-section which is formed alternately of narrow regions and wide regions.

In accordance with yet another feature of the invention, the alternating narrow regions and wide regions are constructed in such a way that the annular gap merges continuously into a plurality of flow ducts which open into the at least one backflow conduit. Each flow duct has a preferably circular cross-section with a diameter which preferably remains constant, as seen in the axial direction, and which thus forms a wide region in the cross-section of the annular gap, beyond a specific degree of narrowing of the annular gap.

In accordance with yet a further feature of the invention, the flow ducts are bores which, in particular, are directed axially relative to the main axis. Thus, the flow ducts and the annular gap can be produced mechanically in a simple way by drilling and/or lathe turning, and the backflow region can therefore be produced from a single, in particular metallic block, in few work steps.

In accordance with yet an added feature of the invention, the flow ducts are disposed symmetrically, in particular on a circle with its center on the main axis.

In accordance with yet an additional feature of the invention, in order to ensure as resistance-free a flow as possible from the annular gap into the backflow conduit, three or more flow ducts are provided, in particular five to ten.

In accordance with again another feature of the invention, the flow ducts overlap axially with the backflow conduit which can be produced as an axial bore. The backflow conduit can have a diameter of about 2 cm. The overlap of the flow ducts with the backflow conduit ensures that the fuel flows into the backflow conduit with little flow resistance. For this purpose, the center line of the flow ducts, which are constructed particularly as axial bores, preferably lies on the outer circumference of the backflow conduit.

As mentioned above, the backflow region of the fuel nozzle configuration is preferably produced by lathe turning and/or drilling. Due to its simple geometry, it can be manufactured from a single part. A backflow region formed of a plurality of assembled components is, of course, likewise possible. The backflow region is connected, preferably through the use of welding, to the component containing the backflow conduit. Other fastening possibilities, for example through pins, are also conceivable. It is also possible to integrate the backflow conduit, in particular to incorporate it by drilling, into a backflow region manufactured from a single part.

With the objects of the invention in view there is also provided an oil burner fuel nozzle configuration, in particular for a gas turbine, comprising a main axis; a backflow region, an inflow region and a fuel nozzle disposed in this order along the main axis; the inflow region generating a swirl flow therein; and a backflow conduit; the backflow region having an annular gap adjacent the inflow region, the annular gap narrowing in a direction away from the inflow region and merging into the backflow conduit.

The use of the fuel nozzle configuration in an oil burner is advantageous, in particular, due to the exact reproducible geometry of the backflow region, the exact centric alignment and the stable structure which is robust even in the case of a pulsating fuel flow. In particular, it is impossible for relatively large parts to fall out, so that a disturbance of the fuel flow in the fuel nozzle can be ruled out and particularly effective operation of the oil burner is thereby ensured. In view of the low wear in the backflow region, the maintenance outlay is also likewise low.

With the objects of the invention in view there is additionally provided a method for regulating the fuel supply of a fluid-fuel burner, which comprises providing a fuel nozzle configuration having a main axis, a backflow region, an inflow region and a fuel nozzle disposed in this order along the main axis, the backflow region having an annular gap adjacent the inflow region, narrowing in a direction away from the inflow region and merging into a backflow conduit; feeding a constant fuel quantity into the fuel nozzle configuration; generating a swirl flow of fuel in the inflow region, in particular by a tangential feed of the fuel; and regulating a fuel quantity flowing back and consequently a fuel quantity flowing through the fuel nozzle with a regulating valve in the backflow conduit. The fuel quantity flowing through the fuel nozzle is thereby also regulated. Through the use of the method, the ratio of the fuel quantity conveyed through the backflow conduit and of the fuel quantity conveyed through the fuel nozzle can be regulated in a ratio of 1:40, in particular 1:30.

Other features which are considered as characteristic for the invention are set forth in the appended claims.

Although the invention is illustrated and described herein as embodied in a fuel nozzle configuration for a fluid-fuel burner, an oil burner using the fuel nozzle configuration and a method for regulating the fuel supply of a fluid-fuel burner, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
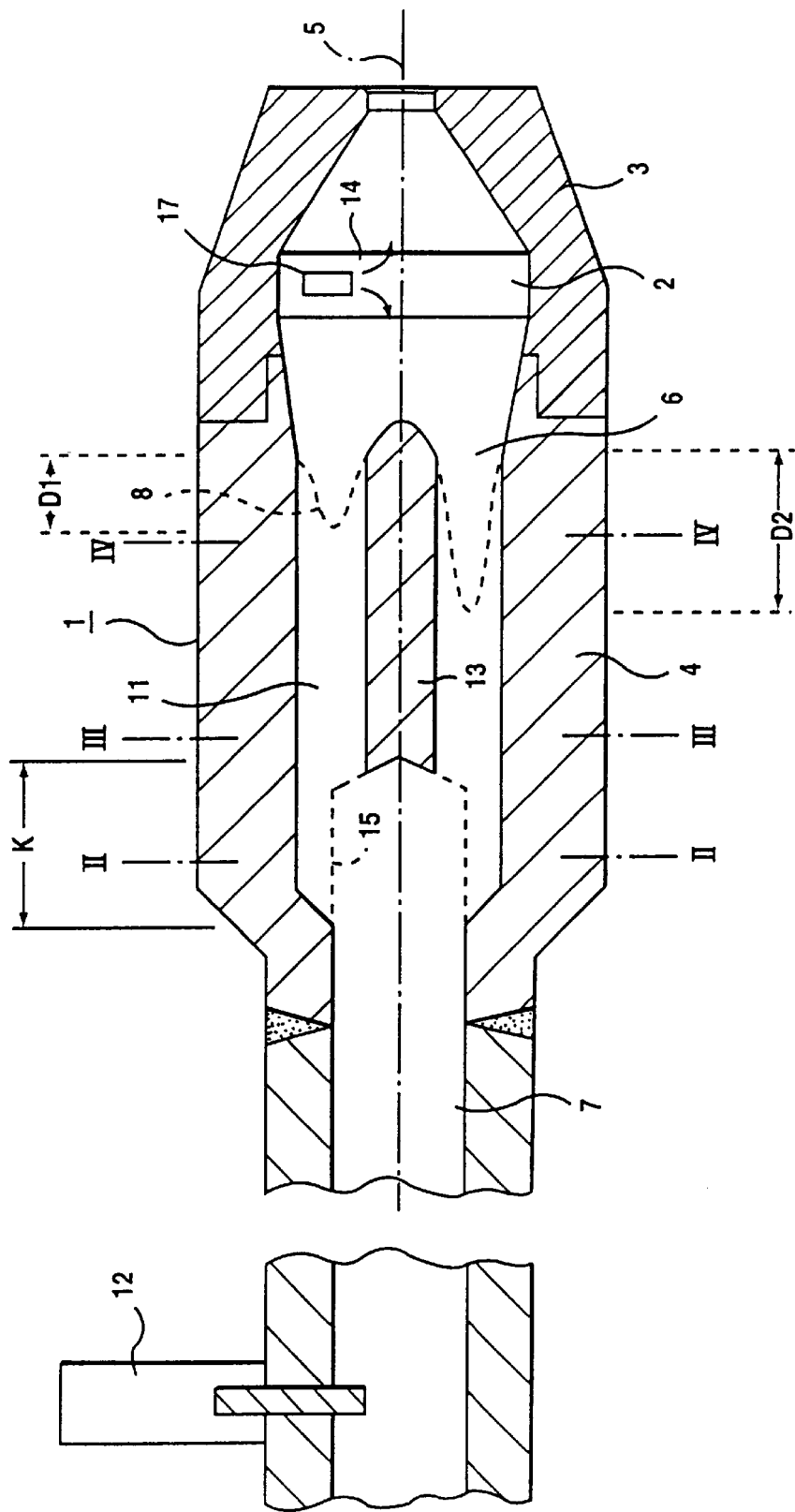
FIG. 1 is a fragmentary, diagrammatic, longitudinal-sectional view of a fuel nozzle configuration.

Referring now to the figures of the drawings in detail and first, particularly, to FIG. 1 thereof, there is seen a longitudinal section through a fuel nozzle configuration 1 which is directed along a main axis 5 and which is largely rotationally symmetrical relative to this main axis 5. The fuel nozzle configuration 1 has a fuel nozzle 3, an inflow region 2 following the fuel nozzle 3 and a backflow region 4 following the inflow region 2, commencing from the right-hand edge of the drawing along the main axis 5. The backflow region 4 has an annular gap 6 in the form of a circular ring, which narrows downstream in a narrowing region (swirl breakdown region) D1, D2. FIG. 1 shows two different versions of the narrowing region, namely a narrowing region D1 above the main axis 5 in which the annular gap 6 narrows within a short distance and a narrowing region D2 below the main axis 5 in which the annular gap 6 narrows over a longer distance. The annular gap 6 merges continuously into a plurality of flow ducts 11 which are constructed as bores. The annular gap 6 has a side facing the inflow region 2 which forms a metallic core 13 of the backflow region 4. The metallic core 13 is disposed centrically relative to the main axis 5. The flow ducts 11 run axially relative to the main axis 5 and open into a backflow conduit 7 disposed centrically relative to the main axis 5. This backflow conduit 7 is likewise constructed as a bore. The flow ducts 11 each have a center 16 (shown in FIGS. 2 and 3) which in each case is disposed on an outer periphery 15 of the backflow conduit 7. A regulating valve 12 is disposed downstream of the flow ducts 11 in the flow conduit 7.

Figure 2:
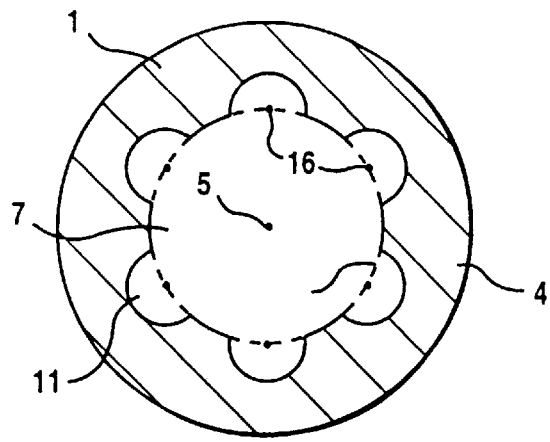
FIGS. 2 to 4 are cross-sectional views of the fuel nozzle configuration, which are respectively taken along lines II—II, III—III and IV—IV of FIG. 1.

FIG. 2 shows a cross-section perpendicular to the main axis 5 through the fuel nozzle configuration 1 in a region K of an axial overlap of the backflow conduit 7 with the flow ducts 11. The centers 16 of the flow ducts 11 lie on the circular outer periphery 15 of the backflow conduit 7.

Figure 3:
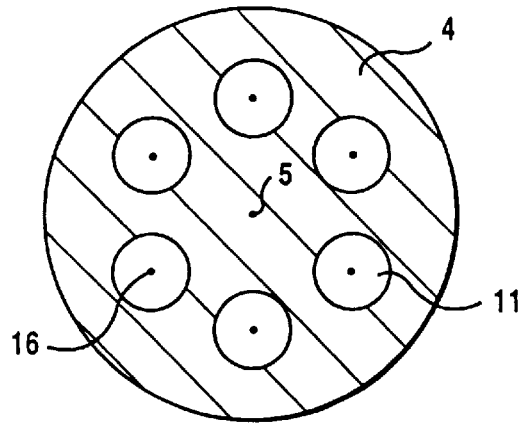

FIG. 3 shows a cross-section perpendicular to the main axis 5 in a region between the overlap region K and the swirl breakdown region D1, D2. The embodiment of FIG. 3 has six flow ducts 11 with a circular cross-section, the centers 16 of which are disposed on a circle that is centric relative to the main axis 5.

Figure 4:
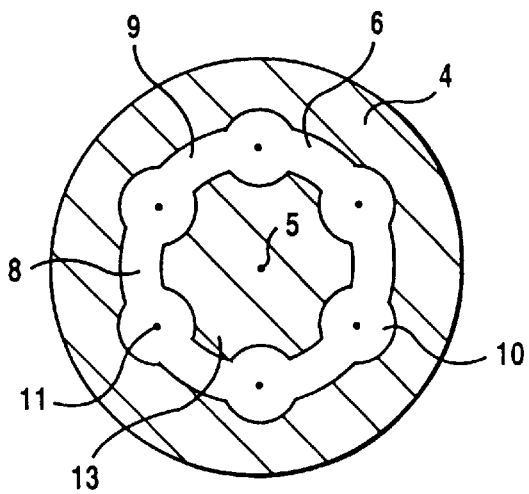

FIG. 4 shows a cross-section perpendicular to the main axis 5 of the backflow region 4. The narrowing annular gap 6 has a cross-section 8 with alternately narrow regions 9 and wide regions 10. The wide regions 10 are formed by the flow ducts 11. The annular gap 6 surrounds the core 13 formed centrically relative to the main axis 5.

Fuel which is fed into the fuel nozzle configuration 1 enters the inflow region 2 in the tangential direction through an inflow duct 17. This results in the formation of a swirled vortex flow which is rotationally symmetrical relative to the main axis 5, in the inflow region 2. Part of this flow is guided into the backflow region 4 according to flow arrows 14. Another part flows in the form of a vortex out of the fuel nozzle 3 into a non-illustrated combustion chamber. This vortex flow is stabilized by the core 13, so as to ensure a uniform injection of fuel into the combustion chamber. Since the backflow region 4 is fixed geometrically in a stable manner in thermomechanical terms, this uniform injection is afforded even over a lengthy period of time under high thermomechanical stresses. The likewise swirled portion of the flow which enters the annular gap 6 experiences a reduction in the swirl in the narrowing region D1 or D2. A fuel flow which is largely swirl-free thereby enters the backflow conduit 7 in the axial overlap region K. The flow cross-section of the backflow conduit 7 can be varied through the use of the regulating valve 12. The fuel quantity flowing back is regulated as a function of the set flow cross-section of the flow conduit 7. In the case of a constant mass fuel flow introduced into the inflow region 2, the setting of the flow cross-section of the backflow conduit 7 therefore also automatically results in a regulation of the fuel quantity injected through the fuel nozzle 3. The ratio of the fuel quantity conveyed through the backflow conduit 7 to the fuel quantity entering the fuel nozzle 3 can be set between 1:30 through the use of the fuel nozzle configuration 1. This corresponds to the requirements of an oil burner for a gas turbine which has to be regulated from idling mode up to maximum power mode.

The invention is distinguished by a particularly robust backflow region that is capable of being produced in a simple way, for a fuel nozzle configuration, particularly for an oil burner of a gas turbine. The backflow region has an annular gap which forms a core (central body) that is centric and rotationally symmetrical relative to the main axis of the fuel nozzle configuration and which serves for stabilizing the injection flow of the fuel nozzle. The annular gap narrows constantly in the direction of a backflow conduit and merges continuously into flow ducts. These flow ducts are preferably constructed axially relative to the main axis and overlap axially with the backflow conduit which likewise runs axially and centrically relative to the main axis. The entire backflow region can be manufactured from a single part by lathe turning and/or drilling. This ensures an exactly reproducible geometry, particularly a centric configuration, at low production costs and with a simple production. The backflow region is fixed stably in its geometrical position even in the case of a pulsating flow and high thermo-mechanical loads. A breakaway or falling out of larger or smaller parts, accompanied by an impairment of the flow in the fuel nozzle, is reliably avoided.

I claim:

1. A fuel nozzle configuration for a fluid-fuel burner, comprising:
    a housing including:
        a backflow portion formed with an annular gap;
        a fuel nozzle portion communicating with said backflow portion;
    said housing having:
        a main axis;
        an inflow chamber disposed along said main axis and adjacent said fuel nozzle portion;
        an inflow duct issuing tangentially into said inflow chamber for generating a swirling flow of fuel in said inflow chamber;
        a backflow conduit formed therein;
    said annular gap communicating with said inflow chamber and said backflow conduit, said annular gap narrowing in a direction away from said inflow chamber for reducing a swirl in a flow of fuel in said annular gap.

2. The fuel nozzle configuration according to claim 1, wherein said annular gap is largely circular and symmetrical relative to said main axis.

3. The fuel nozzle configuration according to claim 1, wherein said annular gap has a cross-section with alternately narrow regions and wide regions.

4. The fuel nozzle configuration according to claim 1, wherein said annular gap with said backflow conduit through a plurality of flow ducts.

5. The fuel nozzle configuration according to claim 4, wherein said flow ducts are bores.

6. The fuel nozzle configuration according to claim 5, wherein said bores extend parallel relative to said main axis.

7. The fuel nozzle configuration according to claim 4, wherein said flow ducts are disposed symmetrically relative to said main axis.

8. The fuel nozzle configuration according to claim 4, wherein said plurality of flow ducts are three to six flow ducts.

9. The fuel nozzle configuration according to claim 4, wherein said flow ducts overlap with said backflow conduit.

10. The fuel nozzle configuration according to claim 1, wherein at least said backflow region is lathe turned.

11. The fuel nozzle configuration according to claim 1, wherein at least said backflow region is drilled.

12. The fuel nozzle configuration according to claim 1, wherein at least said backflow region is lathe turned and drilled.

13. The fuel nozzle configuration according to claim 1, wherein at least said backflow region is produced in one piece.

14. An oil burner fuel nozzle configuration, in particular for a gas turbine, comprising:
    a housing including:
        a backflow portion formed with an annular gap;
        a fuel nozzle portion communicating with said backflow portion;
    said housing having:
        a main axis;
        an inflow chamber disposed along said main axis and adjacent said fuel nozzle portion;
        an inflow duct issuing tangentially into said inflow chamber for generating a swirling flow of fuel in said inflow chamber;
        a backflow conduit formed therein;

said annular gap communicating with said inflow chamber and said backflow conduit, said annular gap narrowing in a direction away from said inflow chamber for reducing a swirl in a flow of fuel in said annular gap.

15. A method for regulating the fuel supply of a fluid-fuel burner, which comprises:

providing a fuel nozzle configuration having a main axis, a backflow region, a fuel nozzle and an inflow region disposed along the main axis between the fuel nozzle and the backflow region, the backflow region having an annular gap adjacent the inflow region, continuously narrowing in a direction away from the inflow region and merging into a backflow conduit;

feeding a constant fuel quantity into the fuel nozzle configuration;

generating a swirl flow of fuel in the inflow region; and regulating a fuel quantity flowing back and consequently a fuel quantity flowing through the fuel nozzle with a regulating valve in the backflow conduit.

16. The fuel nozzle configuration according to claim 1, wherein said backflow conduit and said fuel nozzle portion are disposed along said main axis.

* * * * *